US011444328B2

United States Patent
Yamamoto et al.

(10) Patent No.: US 11,444,328 B2
(45) Date of Patent: Sep. 13, 2022

(54) NON-AQUEOUS ELECTROLYTE FOR SECONDARY BATTERY, SECONDARY BATTERY HAVING THE SAME AND METHOD OF MANUFACTURING THE SAME

(71) Applicant: SAMSUNG SDI CO., LTD., Yongin-si (KR)

(72) Inventors: Hidekazu Yamamoto, Yokohama (JP); Tomonobu Mizumo, Yokohama (JP); Kenichi Kawase, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 157 days.

(21) Appl. No.: 16/279,888

(22) Filed: Feb. 19, 2019

(65) Prior Publication Data

US 2019/0260082 A1   Aug. 22, 2019

(30) Foreign Application Priority Data

Feb. 20, 2018   (JP) .............................. JP2018-028126
Aug. 9, 2018   (KR) ........................ 10-2018-0093240

(51) Int. Cl.
*H01M 10/0569* (2010.01)
*H01M 10/0525* (2010.01)

(52) U.S. Cl.
CPC ... *H01M 10/0569* (2013.01); *H01M 10/0525* (2013.01); *H01M 2300/0037* (2013.01)

(58) Field of Classification Search
CPC .............................................. H01M 10/0569
See application file for complete search history.

(56) References Cited

U.S. PATENT DOCUMENTS 6,855,458 B1 * 2/2005 Kim .................. H01M 10/0525
                                                429/199
2002/0045101 A1   4/2002 Hwang et al.
(Continued)

FOREIGN PATENT DOCUMENTS

| CN | 1317160 A | 10/2001 |
| CN | 1335653 A | 2/2002 |

(Continued)

OTHER PUBLICATIONS

Fen et al., "Highly Fluorinated Interphases Enable High-Voltage Li-Metal BAtteries" Chem 4, 174-185, Jan. 11, 2018 (Year: 2018).*
(Continued)

*Primary Examiner* — Alix E Eggerding
(74) *Attorney, Agent, or Firm* — Lewis Roca Rothgerber Christie LLP

(57) ABSTRACT

A non-aqueous electrolyte for secondary battery, secondary battery having the same and a method of manufacturing the same are provided. The non-aqueous electrolyte includes an electrolytic salt having an electrolytic salt concentration of about 0.5 M (mol/L) to about 3.8 M (mol/L) in the non-aqueous electrolyte, a first solvent having a solubility of the electrolytic salt in a range from about 100 g to about 400 g, and a second solvent having a solubility of the electrolytic salt of less than or equal to about 1 g. The first solvent includes a coordination solvent coordinated with an ionized ion from the electrolytic salt and a free solvent that is not coordinated with an ionized ion from the electrolytic salt, and a peak area ratio of the free solvent determined by a Raman spectrum is less than about 20%.

13 Claims, 4 Drawing Sheets

(56) References Cited

U.S. PATENT DOCUMENTS

| | | |
|---|---|---|
| 2002/0102466 A1 | 8/2002 | Hwang et al. |
| 2002/0172859 A1 | 11/2002 | Roh et al. |
| 2006/0194118 A1 | 8/2006 | Yew et al. |
| 2009/0068565 A1* | 3/2009 | Lee .............. H01M 10/0567 429/331 |
| 2009/0104537 A1 | 4/2009 | Deschamps |
| 2009/0246641 A1 | 10/2009 | Deguchi et al. |
| 2011/0020700 A1 | 1/2011 | Iwaya |
| 2011/0151317 A1 | 6/2011 | Giroud et al. |
| 2013/0022879 A1* | 1/2013 | Yamamoto ...... H01M 10/0567 429/342 |
| 2013/0108933 A1 | 5/2013 | Garcia-Juan et al. |
| 2015/0249269 A1 | 9/2015 | Yoon et al. |
| 2016/0043389 A1* | 2/2016 | Deguchi .......... H01M 10/052 429/200 |
| 2016/0226100 A1 | 8/2016 | Yamada et al. |
| 2017/0214091 A1 | 7/2017 | Abe et al. |
| 2017/0324114 A1 | 11/2017 | Kawai et al. |
| 2018/0254524 A1 | 9/2018 | Zhang et al. |

FOREIGN PATENT DOCUMENTS

| | | |
|---|---|---|
| CN | 101388475 A | 3/2009 |
| CN | 1866605 B | 4/2011 |
| CN | 102870267 A | 1/2013 |
| CN | 105742701 A | 7/2016 |
| CN | 106663838 A | 5/2017 |
| EP | 1176658 A2 | 1/2002 |
| JP | 2003504812 A | 2/2003 |
| JP | 2003-086242 A | 3/2003 |
| JP | 2006245001 A | 9/2006 |
| JP | 2007335406 A | 12/2007 |
| JP | 2008198409 A | 8/2008 |
| JP | 5079523 B2 | 11/2012 |
| JP | 2013-534511 A | 9/2013 |
| JP | 5605221 B2 | 10/2014 |
| JP | 2014-241198 A | 12/2014 |
| JP | 2015088474 A | 5/2015 |
| JP | 2015088476 A | 5/2015 |
| JP | 5727372 B2 | 6/2015 |
| JP | 2015185401 A | 10/2015 |
| JP | 5806660 B2 | 11/2015 |
| JP | WO2016-017809 A1 | 2/2016 |
| KR | 10-2009-0010372 A | 1/2009 |
| WO | WO 2011-142276 A1 | 11/2011 |
| WO | 2016017809 A1 | 2/2016 |
| WO | 2016/079919 A1 | 5/2016 |
| WO | 2018/160209 A1 | 9/2018 |

OTHER PUBLICATIONS

Korean Office Action dated Nov. 23, 2020, of the corresponding Korean Patent Application No. 10-2018-0093240 (4 pages).

EPO Extended Search Report dated Oct. 16, 2019, for corresponding European Patent Application No. 19158228.7 (9 pages).

Wang, et al., "Superconcentrated electrolytes fora high-voltage lithium-ion battery", Nature Communications, 2016, 7,12032, 9 pages.

Japanese Office Action dated Dec. 13, 2021, of the corresponding Japanese Patent Application No. 2018-028126 (3 pages).

European Office Action dated Dec. 20, 2021, of the corresponding EuropeanPatent Application No. 19158228.7. (6 pages).

Chinese Office Action dated Oct. 26, 2021 issued in Chinese Patent Application No. 201910121444.3, and English translation, 13 pages.

Chinese Office Action dated Mar. 25, 2022, accompanying Search Report dated Mar. 18, 2022 of the corresponding Chinese Application No. 201910121444.3, and corresponding English Translation, 17 pages.

National Intellectual Property Administration, PRC, Decision of Rejection, dated Jun. 27, 2022 of corresponding Chinese Patent Application No. 201910121444.3, and 10-page English translation.

"Decision to Grant a Patent", dated Aug. 1, 2022, of the corresponding Japanese Patent Application No. 2018-028126, and 2-page English translation.

* cited by examiner

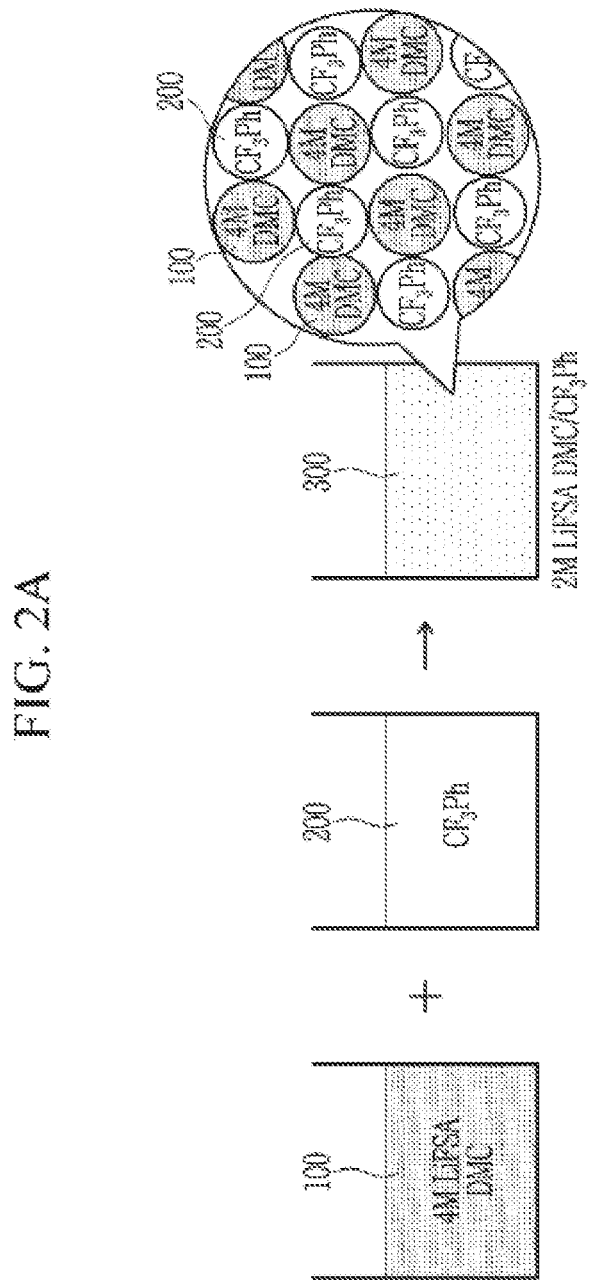

NON-AQUEOUS ELECTROLYTE FOR SECONDARY BATTERY, SECONDARY BATTERY HAVING THE SAME AND METHOD OF MANUFACTURING THE SAME

CROSS-REFERENCE TO RELATED APPLICATION

This application claims priority to and the benefit of Japanese Patent Application No. 2018-028126, filed in the Japan Patent Office on Feb. 20, 2018; and Korean Patent Application No. 10-2018-0093240, filed in the Korean Intellectual Property Office on Aug. 9, 2018, the entire contents of both of which are incorporated herein by reference.

BACKGROUND

1. Field

The present disclosure relates to an electrolyte for a non-aqueous electrolyte secondary battery and a non-aqueous electrolyte secondary battery.

2. Description of the Related Art

A non-aqueous electrolyte secondary battery, such as a lithium ion secondary battery, is widely used as a power source for portable devices, such as a notebook PC (note PC) and a mobile phone. In addition, the lithium ion secondary battery has drawn attention as a power source suitable for xEV, such as an electric vehicle and a hybrid electric vehicle. A lithium ion secondary battery suitable for xEV should have a high capacity and a long cycle-life because of the need to ensure performance equivalent to that of a related art gasoline engine automobile. Also, a lithium ion secondary battery suitable for xEV should have rapid charging characteristics (high-rate charging/discharging) for completing charging within a time equivalent to a fueling time of gasoline engine cars.

SUMMARY

Recently, there is a need for a new performance improvement of a non-aqueous electrolyte secondary battery, and, as a result, there are studies to increase an electrolytic salt concentration in the electrolyte. As a way of increasing a lithium salt concentration, there is a method of coordinating most of the solvents of the electrolyte with ions. That is, a concentration of a free solvent (a solvent that does not coordinate with ions of the electrolyte) is reduced. As a result, the electrochemical stability of the electrolyte may be improved. However, if an electrolytic salt concentration is simply increased, viscosity of the electrolyte is increased and thus cycle-life may be deteriorated. Accordingly, aspects of embodiments of the present invention are directed toward an electrolyte for a non-aqueous electrolyte secondary battery and a lithium ion secondary battery in which viscosity of the electrolyte is decreased while maintaining a concentration of a free solvent of the electrolyte at a low level.

An embodiment provides an electrolyte for a non-aqueous electrolyte secondary battery including an electrolytic salt (or electrolyte salt), a first solvent, and a second solvent, wherein the electrolytic salt is included at a concentration of about 0.5 M (mol/L) to about 3.8 M (mol/L) in the electrolyte, the first solvent has a solubility of the electrolytic salt in a range from about 100 g to about 400 g, the second solvent has a solubility of the electrolytic salt of less than or equal to about 1 g, the first solvent includes a coordination solvent coordinated with an ionized ion from the electrolytic salt and a free solvent that is not coordinated with an ionized ion from the electrolytic salt, and a peak area ratio of the free solvent determined by a Raman spectrum is less than about 20%.

The peak area ratio of the free solvent is a ratio of a peak area of the free solvent relative to a total area of the peak area of the free solvent and a peak area of the coordination solvent determined by the Raman spectrum, and the peak area is an area under a peak separated by a peak separation treatment and a set or predetermined baseline.

The electrolytic salt may be included at a concentration of about 1.7 M (mol/L) to about 3.0 M (mol/L) in an electrolyte.

The electrolytic salt may include a lithium salt.

The first solvent may include at least one selected from dimethyl carbonate (DMC), ethyl acetate (EA), methyl propionate (MP), and methyl acetate (MA).

The second solvent may include at least one selected from trifluorotoluene ($CF_3Ph$) and fluorobenzene (FB).

The peak area ratio of the free solvent may be greater than or equal to about 1%.

Another embodiment provides a non-aqueous electrolyte secondary battery including the electrolyte.

According to embodiments of the present invention, viscosity of the electrolyte may be lowered while a concentration of the free solvent of the electrolyte is maintained to be low.

BRIEF DESCRIPTION OF THE DRAWINGS

FIGS. 2A and 2B are views for explaining a configuration of an electrolyte for a non-aqueous electrolyte secondary battery according to an embodiment.

DETAILED DESCRIPTION

Figure 1:
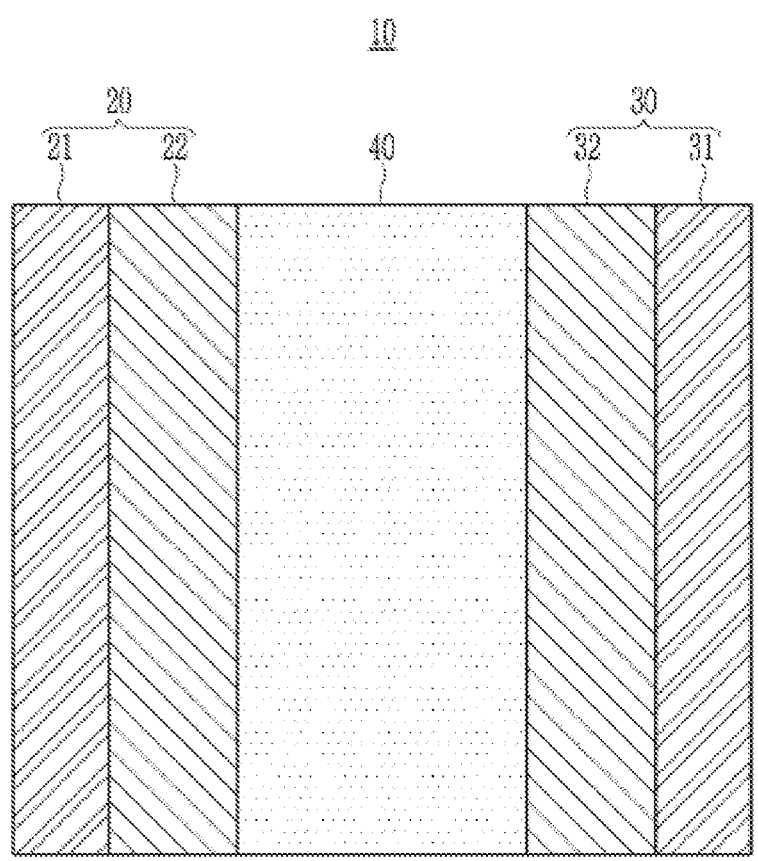
FIG. 1 is a cross sectional side view showing a configuration of a lithium ion secondary battery.

Embodiments of the present invention will be described in more detail with reference to the accompanying drawings. In the description and drawings, constituent elements having substantially the same functional constitution may be denoted by like reference numerals, and redundant description may not be provided.

Configuration of Lithium Ion Secondary Battery

Referring to FIG. 1, a configuration of a lithium ion secondary battery 10 according to an embodiment of the present invention is described.

The lithium ion secondary battery 10 includes a positive electrode 20, a negative electrode 30, a separator 40, and a poor solvent-containing electrolyte. The lithium ion secondary battery 10 has a charge-reaching voltage (an oxidation reduction potential) of, for example, greater than or equal to about 4.0 V (vs. Li/Li+) and less than or equal to about 5.0 V, particularly greater than or equal to about 4.2 V and less than or equal to about 5.0 V. The shape of the lithium ion secondary battery 10 is not particularly limited, and specifically the lithium ion secondary battery 10 may have any suitable cylindrical, prismatic, laminate-type, and/or button-type shape. The poor solvent-containing electrolyte may include: an electrolytic salt (or electrolyte salt), having a concentration of greater than or equal to about 0.5 M (mol/L) and less than or equal to about 3.8 M (mol/L) in the electrolyte; a first solvent; and a second solvent. The first solvent has a solubility with respect to the electrolytic salt of greater than or equal to about 100 g at 25° C., and the second solvent has a solubility with respect to the electrolytic salt of less than or equal to about 1 g at 25° C. More details will be described later.

Positive Electrode

The positive electrode 20 includes a positive current collector 21 and a positive active material layer 22.

The positive current collector 21 may use any conductor without particular limit. For example, it may include at least one of aluminum, stainless steel, and nickel plated (nickel coated) steel.

The positive active material layer 22 may include a positive active material, and may further include a conductive agent, a binder for a positive electrode or combination thereof.

The positive active material may be, for example, lithium-containing solid solution oxide, and may be any material that can electrochemically intercalate and deintercalate lithium ions without particular limitation. The solid solution oxide may be, for example, $Li_aMn_xCo_yNi_zO_2$ ($1.150 \leq a \leq 1.430$, $0.45 \leq x \leq 0.6$, $0.10 \leq y \leq 0.15$, $0.20 \leq z \leq 0.28$), $LiMn_xCo_yNi_zO_2$ ($0.3 \leq x \leq 0.85$, $0.10 \leq y \leq 0.3$, $0.10 \leq z \leq 0.3$), or $LiMn_{1.5}Ni_{0.5}O_4$.

The conductive agent may include, for example, at least one of carbon black (such as Ketjenblack, acetylene black, and/or the like), natural graphite, artificial graphite, carbon nanotubes, graphene, fiber-type carbons (such as carbon nanofibers), and/or the like and a composite of the fiber-type carbons and the carbon black. The conductive agent is not particularly limited as long as it increases conductivity of the positive electrode.

Non-limiting examples of the binder for the positive electrode may be polyvinylidene fluoride, ethylene-propylene-diene terpolymer, a styrene butadiene rubber, an acrylonitrile butadiene rubber, a fluororubber, polyvinyl acetate, polymethyl methacrylate, polyethylene, nitrocellulose, and the like. The binder is not particularly limited, as long as it binds the positive active material and the conductive agent with the positive current collector 21.

The positive active material layer 22 is manufactured, for example, in the following method. First, a positive electrode mixture is manufactured by dry-mixing the positive active material, the conductive agent, and the binder for the positive electrode. Subsequently, the positive electrode mixture is dispersed in an appropriate organic solvent to form a positive electrode mixture slurry, and the positive electrode mixture slurry is coated on the positive current collector 21, dried, and compressed to form a positive active material layer.

Negative Electrode

The negative electrode 30 includes a negative current collector 31 and a negative active material layer 32.

The negative current collector 31 may use any suitable conductor without particular limit. The negative current collector 31 may include, for example, at least one of aluminum, stainless steel, nickel plated (nickel coated) steel, and the like.

The negative active material layer 32 may include a conductive agent and a binder in addition to at least negative active material. An amount ratio of the negative active material, the conductive agent, and the binder is not particularly limited, and may be any amount ratio that may be used in a general lithium ion secondary battery.

Non-limiting examples of the negative active material may be a graphite-based active material, a silicon (Si) and/or tin (Sn)-based active material, a titanium oxide ($TiO_x$) active material, and the like. The negative electrode active material is not particularly limited as long as it is a material capable of electrochemically intercalating and deintercalating lithium ions. The graphite-based active material may be artificial graphite, natural graphite, a mixture of artificial graphite and natural graphite, and/or natural graphite coated with artificial graphite. The silicon or tin-based active material may be fine particulates of silicon and/or tin, fine particulates of an oxide of silicon or tin, an alloy of silicon and/or tin, and/or the like. The titanium oxide active material may be $Li_4Ti_5O_{12}$ and/or the like. In addition, the negative active material may be metal lithium (Li).

The conductive agent may be the same as the conductive agent used in the positive active material layer 22.

The binder for the negative electrode may be, for example, polyvinylidene difluoride, an ethylenepropylene diene terpolymer, a styrene-butadiene rubber (SBR), an acrylonitrile-butadiene rubber, a fluororubber, polyvinyl acetate, polymethyl methacrylate, polyethylene, nitrocellulose, and/or the like. On the other hand, the binder for the negative electrode is not particularly limited as long as it binds the negative active material and the conductive agent on the negative current collector 31. In addition, an amount of the binder for the negative electrode is not particularly limited and may be any amount that is applied to a negative active material layer of a lithium ion secondary battery.

Separator

The separator 40 is not particularly limited and may be any suitable separator in a lithium ion secondary battery.

The separator 40 may include a porous layer and/or a non-woven fabric having excellent high-rate discharge performance, which may be used alone or in a mixture thereof. Non-limiting examples of the resin of the separator 40 may be a polyolefin-based resin such as polyethylene or polypropylene, a polyester-based resin such as polyethylene terephthalate or polybutylene terephthalate, polyvinylidene fluoride (PVDF), a vinylidene fluoride (VDF)-hexafluoro propylene (HFP) copolymer, a vinylidene fluoride-perfluorovinylether copolymer, a vinylidene fluoride-tetrafluoroethylene copolymer, a vinylidene fluoride-trifluoro ethylene copolymer, a vinylidene fluoride-fluoroethylene copolymer, a vinylidene fluoride-hexafluoro acetone copolymer, a vinylidene fluoride-ethylene copolymer, a vinylidene fluoride-propylene copolymer, a vinylidene fluoride-trifluoro propylene copolymer, a vinylidene fluoride-tetrafluoroethylene-hexafluoro propylene copolymer, a vinylidene fluoride-ethylene-tetrafluoroethylene copolymer, and the like.

Poor Solvent-Containing Electrolyte

Next, the poor solvent-containing electrolyte (an electrolyte for a non-aqueous electrolyte secondary battery) according to the present embodiment is described. The poor solvent-containing electrolyte includes an electrolytic salt having a concentration of about 0.5 M (mol/L) to about 3.8 M (mol/L) in the electrolyte, a first solvent, and a second solvent. The first solvent has a solubility with respect to the electrolytic salt of greater than or equal to about 100 g at 25° C., and the second solvent has a solubility with respect to the electrolytic salt of less than or equal to about 1 g at 25° C. The solubility refers to a weight of the electrolytic salt dissolved in 100 g of the solvent. Therefore, the first solvent is a good solvent with respect to the electrolytic salt, and the second solvent is a poor solvent with respect to the electrolytic salt.

On the other hand, the upper limit of the solubility with respect to the electrolytic salt of the first solvent at 25° C. is not particularly limited, and may be, for example, 400 g. In addition, the lower limit of the solubility with respect to the electrolytic salt of the second solvent at 25° C. is not particularly limited but may be, for example, 0 g.

The first solvent may be classified into a coordination solvent coordinated with ionized ions (e.g., lithium ions) from the electrolytic salt and a free solvent that is not coordinated with an ionized ion from the electrolytic salt.

Figure 2B:
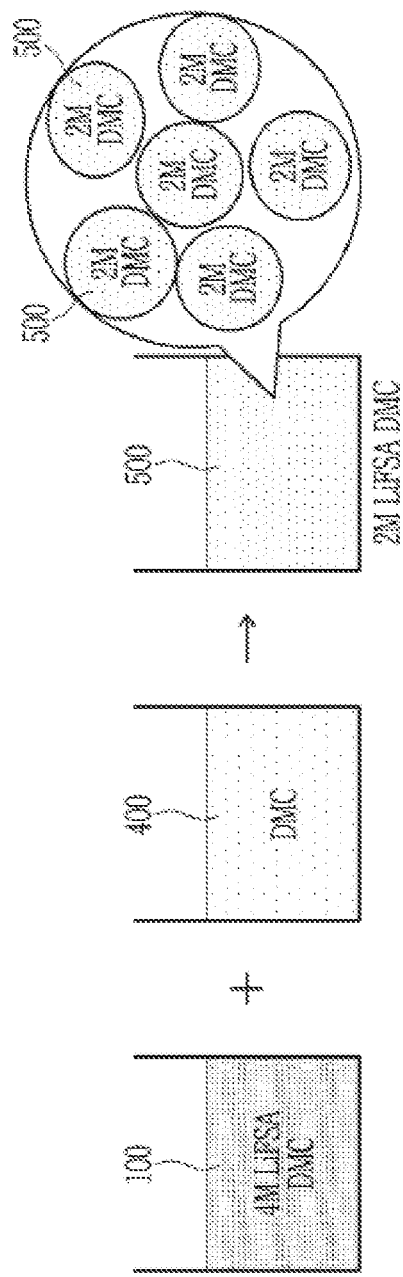
Figure 3:
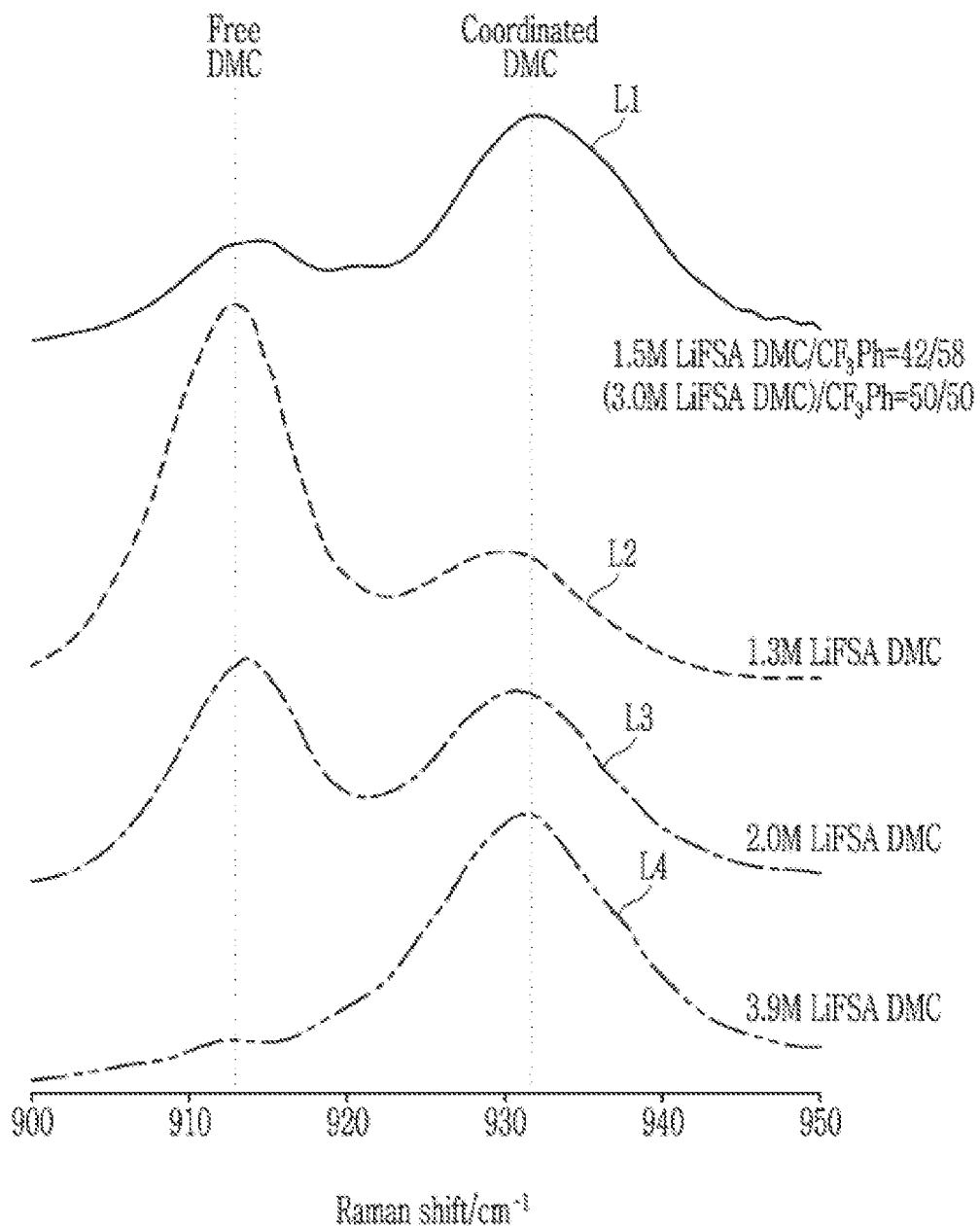
FIG. 3 is a graph showing Raman spectra of the electrolytes according to Examples.

Referring to FIGS. 2A, 2B, and 3, the poor solvent-containing electrolyte according to the present embodiment is described in more detail. As described above, in order to improve performance of the lithium ion secondary battery 10, an electrolytic salt concentration of the electrolyte may be increased. Thus, a free solvent concentration of the electrolyte may be decreased, and the electrochemical stability of the electrolyte may be improved. However, when the electrolytic salt concentration is simply increased, viscosity of the electrolyte may be increased, and thus the cycle-life may be reduced.

Accordingly, as a result of studying a technique capable of reducing the viscosity of the electrolyte while reducing the free solvent concentration of the electrolyte, it has been proposed that a poor solvent (i.e., a second solvent) be injected into the electrolyte in which the electrolytic salt is dissolved at a high concentration. An embodiment is illustrated in FIG. 2A. The electrolyte 100 of FIG. 2A includes LiFSA dissolved in dimethyl carbonate (DMC) at a concentration of 4 M (mol/L). The LiFSA is an electrolytic salt and the dimethyl carbonate is a good solvent (i.e., first solvent). The second solvent 200 is trifluorotoluene ($CF_3Ph$). A poor solvent-containing electrolyte 300 is produced by pouring the second solvent 200 into the electrolyte 100. The amount of the second solvent 200 relative the electrolyte 100 may be 50:50 (a volume ratio). Thus, an apparent LiFSA concentration may be 2 M (mol/L) (i.e., based on a total amount of the poor solvent-containing electrolyte 300).

However, the second solvent 200 is not dissolved in the electrolyte 100 and is dispersed therein in the poor solvent-containing electrolyte 300. Therefore, the LiFSA is still at a high concentration (i.e., 4 M (mol/L)) in the electrolyte 100. In other words, the free solvent concentration is hardly changed in the electrolyte 100. The poor solvent-containing electrolyte 300 includes the second solvent 200 in which the electrolytic salt is hardly dissolved, and the viscosity may be reduced. On the other hand, even if the poor solvent-containing electrolyte (e.g., electrolyte solution) 300 is allowed to stand for 24 hours, a phenomenon such as phase separation does not occur. Therefore, it is considered that the poor solvent-containing electrolyte 300 maintains a uniform state.

On the other hand, as shown in FIG. 2B, when a good solvent 400 (herein, dimethyl carbonate) is added to the electrolyte (e.g., electrolyte solution) 100, a low concentration electrolyte 500 having an electrolyte concentration diluted into 2 M (mol/L) may be produced. In this example, an injection amount of the good solvent 400 is set to 50:50 (volume ratio) with respect to the electrolyte 100. In this case, the viscosity of the electrolyte decreases, and the free solvent concentration also decreases.

The free solvent concentration of the electrolyte may be determined by a Raman spectrum. Referring to FIG. 3, a method of determining the free solvent concentration by the Raman spectrum is described.

Graph L1 illustrates a Raman spectrum of the poor solvent-containing electrolyte according to the present embodiment. Graph L1 illustrates Raman spectra of an electrolyte (3.0 M (mol/L) LiFSA DMC) in which LiFSA is dissolved in a first solvent (dimethyl carbonate) at a concentration of 3.0 M (mol/L) and a poor solvent-containing electrolyte in which the electrolyte and a second solvent are mixed in 50:50 (volume ratio). Therefore, the electrolytic salt is LiFSA, the first solvent is dimethyl carbonate, and the second solvent is trifluorotoluene, and as a result, in the poor solvent-containing electrolyte, an apparent concentration of LiFSA (i.e., a concentration based on a total amount of the poor solvent-containing electrolyte) is to be 1.5 M (mol/L), and the dimethyl carbonate and the trifluorotoluene is to be mixed at 42:58 (volume ratio).

Graph L2 illustrates a Raman spectrum of an electrolyte in which LiFSA is dissolved in a first solvent (dimethyl carbonate) at a concentration of 1.3 M (mol/L).

Graph L3 illustrates a Raman spectrum of an electrolyte in which LiFSA is dissolved in dimethyl carbonate at a concentration of 2 M (mol/L).

Graph L4 illustrates a Raman spectrum of an electrolyte in which LiFSA is dissolved in dimethyl carbonate at a concentration of 3.9 M (mol/L).

When the first solvent is dimethyl carbonate, a peak based on an $O-CH_3$ stretching vibration of the dimethyl carbonate molecule is observed at different positions depending on a state of the dimethyl carbonate. Herein, the peak of the free solvent is defined as 913 $cm^{-1}$ and the peak of the coordination solvent is defined as 930 $cm^{-1}$ to 935 $cm^{-1}$. In addition, a minute peak corresponding to trifluorotoluene is observed at 920 $cm^{-1}$. Therefore, the intensity of the separated peak may be specified by separating the peak of the Raman spectrum. For example, as the free solvent concentration is low, the peak intensity corresponding to the free solvent becomes small.

Since electrolytes of Graphs L2 and L3 include LiFSA at a low concentration, many free solvents exist in the electrolyte besides the coordination solvent. Therefore, in Graphs L2 and L3, both the peak corresponding to the coordination solvent and the peak corresponding to the free solvent are detected, and a peak intensity corresponding to the free solvent increases.

On the other hand, an electrolyte of Graph L4 includes LiFSA at a high concentration, and thus, most of the solvent of the electrolyte is a coordination solvent and a free solvent is hardly present. Therefore, in Graph L4, a peak intensity with respect to the coordination solvent is extremely large, but a peak intensity with respect to the free solvent is extremely small. On the other hand, at first glance, the peak intensity with respect to the free solvent is not observed, but when the peak is separated, the peak with respect to the free solvent may be microscopically observed. According to Graphs L2 to L4, as the concentration of the electrolytic salt increases, the peak intensity of the free solvent decreases, that is, the concentration of the free solvent decreases.

Graph L1 is between Graph L2 (a LiFSA concentration of 1.3 M (mol/L)) and the Graph L3 (a LiFSA concentration of 2.0 M) because the apparent concentration of LiFSA is 1.5 M (mol/L). Therefore, it is expected that a peak intensity with respect to the free solvent will be a value between Graph L2 and Graph L3, but actually it is similar to Graph L4 and different from Graph L2 and Graph L3. Specifically, because the electrolyte 100 is separated from the second solvent 200 in the poor solvent-containing electrolyte, as described above, LiFSA is present at a high concentration in the electrolyte 100, while the free solvent is present at a low concentration, and, accordingly, Graph L1 has a shape close to that of Graph L4. Resultantly, peak intensity with respect to the coordination solvent is very strong, but peak intensity with respect to the free solvent is extremely weak. On the other hand, at first glance, the peak intensity with respect to the free solvent is not observed, but peaks with respect to the free solvent may be observed if the peaks are separated.

In this way, the peak intensity with respect to the free solvent becomes much weaker as the free solvent concentration becomes lower. Therefore, in the present embodiment, the concentration of the free solvent is determined according to the peak area ratio of the free solvent. In other words, a peak area of the free solvent and a peak area of the coordination solvent which are determined by a Raman spectrum are calculated. The peak area refers to an area under a peak separated by a peak separation treatment and a set or predetermined baseline. Then, a ratio of a peak area of the free solvent relative to a total area of a peak area of the free solvent and a peak area of the coordination solvent determined by the Raman spectrum is calculated.

The free solvent may have a peak area ratio of less than about 20%. Specifically, the free solvent may have a peak area ratio of less than or equal to about 15%. Herein, the concentration of the free solvent becomes very low, and, accordingly, electrochemical stability of the electrolyte may be improved. In addition, because the second solvent 200 is added to the electrolyte 100 in the present embodiment, viscosity becomes low, and, furthermore, a cycle-life of the lithium ion secondary battery 10 may be improved. The peak area ratio of the free solvent is not particularly limited but may be greater than or equal to about 1%, for example, greater than or equal to about 3%.

Next, a specific composition of the poor solvent-containing electrolyte according to the present embodiment is explained. The electrolytic salt may be any electrolytic salt used in a related art lithium ion battery without particular limit. For example, it may be an inorganic ion salt including lithium (Li), sodium (Na), and/or potassium (K), such as $LiN(SO_2F)_2$ (lithium bisfluoro sulfonyl amide, LiFSA), lithium bisfluoro sulfonyl imide (LiFSI), $LiClO_4$, $LiBF_4$, $LiAsF_6$, $LiPF_6$, $LiPF_{6-x}(CnF_{2n+1})_x$ [wherein, 1<x<6, and n=1 or 2], LiSCN, LiBr, LiI, $Li_2SO_4$, $Li_2B_{10}Cl_{10}$, $NaClO_4$, NaI, NaSCN, NaBr, $KClO_4$, KSCN, and/or the like, and/or an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $Li(CH_3)_4NBF_4$, $Li(CH_3)_4NBr$, $Li(C_2H_5)_4NClO_4$, $Li(C_2H_5)_4NI$, $Li(C_3H_7)_4NBr$, $Li(n-C_4H_9)_4NClO_4$, $Li(n-C_4H_9)_4NI$, $Li(C_2H_5)_4N$-maleate, $Li(C_2H_5)_4N$-benzoate, $Li(C_2H_5)_4N$-phthalate, lithium stearyl sulfonate, lithium octyl sulfonate, lithium dodecyl benzenesulfonate, and/or the like. Such an ion salt or ionic compound may be used alone or in a mixture of two or more. The electrolytic salt may include a lithium salt.

The concentration of the electrolytic salt may be about 0.5 M (mol/L) to about 3.8 M (mol/L), for example, about 1.7 M (mol/L) to about 3.0 M (mol/L), or about 1.9 M (mol/L) to about 2.7 M (mol/L). The electrolytic salt concentration is an electrolytic salt concentration with respect to an entirety of the poor solvent-containing electrolyte. That is, the electrolyte 100 is dispersed in the poor solvent-containing electrolyte, and the electrolytic salt is present at a higher concentration in the electrolyte 100. Therefore, the free solvent concentration is lowered.

The first solvent is a good solvent with respect to the electrolytic salt and may have a solubility with respect to the electrolytic salt of greater than or equal to about 100 g at 25° C. The first solvent may include dimethyl carbonate (DMC), ethyl acetate (EA), methyl propionate (MP), and/or methyl acetate (MA). On the other hand, dimethyl carbonate, ethyl acetate, methyl propionate, and methyl acetate have each solubility of 189 g, 163 g, 163 g, and 194 g with respect to LiFSA at 25° C. and thus may satisfy a requirement of the first solvent.

The second solvent is a poor solvent with respect to the electrolytic salt and may have solubility with respect to the electrolytic salt of less than or equal to about 1 g at 25° C. The second solvent may be desirably dispersed in the electrolyte and may include, for example, trifluorotoluene ($CF_3Ph$) and/or fluorobenzene (FB). Both the trifluorotoluene ($CF_3Ph$) and fluorobenzene (FB) may have solubility of less than or equal to about 0.2 g with respect to LiFSA at 25° C. Accordingly, these compounds satisfy a requirement of the second solvent.

On the other hand, the poor solvent-containing electrolyte may include various additives. The additives may include a negative electrode-acting additive, a positive electrode-acting additive, an ester-based additive, a carbonate ester-based additive, a sulfuric acid ester-based additive, a phosphoric acid ester-based additive, a boric acid ester-based additive, an acid anhydride additive, an electrolytic additive, and the like. The additives may be used alone or in a mixture of two or more, and a mixing ratio in the case of using a mixture of two or more additives may be appropriately adjusted according to a desired battery performance, which may be widely understood by those skilled in the art.

Method of Manufacturing Lithium Ion Secondary Battery

A method of manufacturing the lithium ion secondary battery 10 is described.

The positive electrode 20 is manufactured as follows. First, a mixture of a positive active material, a conductive agent, and a binder for a positive electrode are dispersed in a solvent (for example, N-methyl-2-pyrrolidone) to prepare slurry. Subsequently, the slurry is coated on a positive current collector 21 and the same is dried to manufacture a positive active material layer 22. On the other hand, a coating method is not particularly limited. Non-limiting examples of the coating method may be a knife coater method, a gravure coater method, and the like. The below coating process may be performed according to the same method. Subsequently, the positive active material layer 22 is compressed with a press to manufacture a positive electrode 20.

The negative electrode 30 is manufactured according to the same method as that of the positive electrode 20. First, a mixture of a negative active material and a binder for a negative electrode is dispersed in a solvent (for example, water) to prepare slurry. Subsequently, the slurry is coated on the negative current collector 31 and dried to form a negative active material layer 32. The drying is desirably performed at a temperature of about 150° C. or greater. Then, the negative active material layer 32 is compressed with a press to manufacture a negative electrode 30.

The poor solvent-containing electrolyte may be prepared as follows. For example, electrolytic salt is dissolved in the first solvent to prepare an electrolyte. Subsequently, the electrolyte is mixed with the second solvent to prepare the poor solvent-containing electrolyte. Herein, the method of preparing the electrolyte is not limited to the above method. For example, the electrolytic salt may be dissolved in a mixed solution of the first and second solvents to prepare an electrolyte according to the present embodiment, that is, an electrolyte in which the second solvent is dispersed.

Subsequently, the separator 40 is disposed between the positive electrode 20 and the negative electrode 30 to manufacture an electrode assembly. Then, the electrode assembly is manufactured to have a desired shape (for example, a cylinder, a prism, a laminate, a button, and/or the like) and then inserted into a container having the same shape. Then, the poor solvent-containing electrolyte is injected into the container in order to impregnate the electrolyte into pores of the separator 40 to manufacture a lithium ion rechargeable battery.

According to the present embodiment, the viscosity of the electrolyte may be decreased while maintaining the free solvent concentration in the electrolyte at a low level. As a result, a cycle-life may be improved.

Hereinafter, examples of the present invention and comparative examples are described. However, the following examples are only illustrative of the present invention, and the present invention is not limited to the following examples.

Example 1

Manufacture of Lithium Ion Secondary Battery

In Example 1, the lithium ion secondary battery (e.g., battery cell) 10 is manufactured by the following processes.

Manufacture of Positive Electrode

As for a positive active material, lithium nickel cobalt aluminum oxide represented by $LiNi_{0.88}Co_{0.1}Al_{0.02}O_2$ was prepared. The positive active material, a carbon powder as a conductive agent, and polyvinylidene fluoride as a binder were mixed in a weight ratio of 94:4:2. N-methyl-2-pyrrolidone was added to the mixture and mixed to prepare positive electrode slurry.

Subsequently, the positive electrode slurry was coated to be 222 mm long and 29 mm wide on one surface of a positive current collector including an aluminum foil having a thickness of 12 μm, a length of 238 mm, and a width of 29 mm and, in addition, 172 mm long and 29 mm wide on the other surface thereof facing oppositely away from the one surface. The positive current collector coated with the positive electrode slurry was dried and then compressed to manufacture a positive electrode. The positive electrode had a thickness of 125 μm, and the positive active material layer was loaded in an amount of 42.5 mg/cm$^2$ on the positive current collector and had filling density of 3.75 g/cm$^3$. Subsequently, the positive electrode was completed by utilizing or attaching another current collector (e.g., an uncoated current collector) including an aluminum plate having a thickness of 70 μm, a length of 40 mm, and a width of 4 mm to where the positive active material layer was not formed on the positive current collector.

Manufacture of Negative Electrode

As for a negative active material, artificial graphite and silicon-containing carbon were used, and as for a binder, carboxylmethyl cellulose and styrene butadiene rubber were used. The artificial graphite, the silicon-containing carbon, the carboxylmethyl cellulose, and the styrene butadiene rubber were mixed in a weight ratio of 92.2:5.3:1.0:1.5, and then mixed with water to prepare negative electrode slurry. Subsequently, the negative electrode slurry was coated to be 235 mm long and 30 mm wide on one surface of a negative current collector including an aluminum foil having a thickness of 8 μm, a length of 271 mm, and a width of 30 mm, and then 178 mm long and 30 mm wide on the other surface of the negative current collector. The negative current collector coated with the negative electrode slurry was dried and compressed to manufacture a negative electrode. Herein, the negative electrode had a thickness of 152 μm, and the negative active material layer was loaded on the negative current collector in an amount of 23.0 mg/cm$^2$ and had filling density of 1.6 g/cm$^3$. Then, the negative electrode was completed by attaching a current collector including a nickel plate having a thickness of 70 μm, a length of 40 mm, and a width of 4 mm to where the negative active material layer was not formed on the negative current collector.

Manufacture of Poor Solvent-Containing Electrolyte

As for a first solvent, dimethyl carbonate was used, and as for electrolytic salt, LiFSA was used. Subsequently, LiFSA was dissolved to have a concentration of 3.9 M (mol/L) in dimethyl carbonate to prepare an electrolyte. The electrolyte (a 3.9 M (mol/L) LiFSA DMC solution) was mixed with trifluorotoluene as a second solvent in a volume ratio of 50:50 to prepare a poor solvent-containing electrolyte. The poor solvent-containing electrolyte included LiFSA in an apparent concentration of 1.9 M (mol/L) (i.e., a concentration based on an entire volume of the poor solvent-containing electrolyte), and the dimethyl carbonate and the trifluorotoluene were mixed in a ratio of 39:61 (a volume ratio).

Measurement of Raman Spectrum of Poor Solvent-Containing Electrolyte

A Raman spectrum of the poor solvent-containing electrolyte was measured. The Raman spectrum was measured by using NRS-4001 made by JASCO Corporation. The measurement was performed under a condition of an excitation wavelength of 532 nm, 50 times object lens, exposure time of 10 seconds, number of integration of 64, and laser intensity of 5.0 mW. In order to constantly maintain the composition of the poor solvent-containing electrolyte during the measurement, the poor solvent-containing electrolyte was sealed in a quartz closed cell under a dry environment at a dew point of −40° C.

Subsequently, a peak of the measured Raman spectrum was separated and treated. Specifically, a peak depending on an O—CH$_3$ stretching vibration of a dimethyl carbonate molecule was observed in a different location depending on a state of dimethyl carbonate. As described above, a peak of a free solvent (so-called free DMC) was found before and after 913 cm$^{-1}$, a peak of a coordination solvent (so-called coordination DMC) was found in a range of 930 cm$^{-1}$ to 935 cm$^{-1}$, and a small peak of trifluorotoluene was found at 920 cm$^{-1}$. Accordingly, 913 cm$^{-1}$, 935 cm$^{-1}$, and 920 cm$^{-1}$ were used as a central wavelength to separate peaks. The peak separation was performed by using a spectrum interpretation software of "Spectrum Manager Program" made by JASCO Corporation. A ratio of a Lorenz curve/a Gauss curve ratio was randomly set. Thereby, a peak of the free solvent and a peak of the coordination solvent were specified.

Subsequently, a peak area of the free solvent and a peak area of the coordination solvent were calculated. The peak area indicates an area under a peak separated by the peak separation treatment and a set or predetermined baseline. Here, as an example, the peak area or the area of the peak is proportional to and/or can be used to quantify the amount of the compound that is present and associated with the peak. Subsequently, a peak area ratio (%) (i.e., a peak area ratio of the free solvent) was determined based on a ratio of the peak area of the free solvent to a total area of the peak area of the free solvent and the peak area of the coordination solvent. That is, the peak area ratio of the free solvent is the ratio of the peak area of the free solvent relative to the total area of the peak area of the free solvent and the peak area of the coordination solvent determined by the Raman spectrum. Here, the peak area ratio of the free solvent was determined or calculated to be 3%.

Viscosity

Subsequently, viscosity of the poor solvent-containing electrolyte was measured utilizing the following method. The viscosity was measured by connecting "Probe PR-110-L" (made by Sekonic Corp.) to a vibration viscometer, "Viscomate VM-100A" (made by Sekonic Corp). The viscosity measurement was performed under a dry environment at 23° C. and a dew point of −40° C. The Probe PR-110-L was dipped in 5 mL of the electrolyte to read a marked scale. Since the marked scale was (viscosity)×(specific gravity) in the VM-100A vibration viscometer, the marked scale was divided by separately measured specific gravity to calculate viscosity (mPa·s).

Manufacture of Lithium Ion Secondary Battery

The manufactured positive electrode, negative electrode, and poor solvent-containing electrolyte were used to manufacture a lithium ion secondary battery cell. Specifically, the positive electrode and the negative electrode were disposed to face each other, a separator was interposed therebetween, and then they were wound and pressed to manufacture a flat electrode assembly. As for the separator, two sheets of 350 mm-long and 32 mm-wide polyethylene porous separator were used. Then, the electrode assembly was put in a battery container made of an aluminum laminate, and the prepared poor solvent-containing electrolyte was put therein. Herein, each current collecting tab of the positive electrode and the negative electrode was extended out of the battery container. A design capacity of the battery (e.g., the battery cell) was 480 mAh.

Evaluation of Cycle-Life Characteristics

A cycle-life of each of the manufactured lithium ion secondary battery cells was evaluated in the following method. The lithium ion secondary battery cells were charged up to a voltage of 4.3 V at a constant current of 48 mA and, in addition, up to a current of 24 mA at a constant voltage of 4.3 V at 25° C. Then, the lithium ion secondary battery cells were discharged at a current of 48 mA up to a voltage of 2.8 V. Herein, discharge capacity of the cells was measured as initial discharge capacity (Q1).

Subsequently, the initially charged and discharged lithium ion secondary battery cells as aforementioned were charged and discharged at 25° C. as follows. In other words, the lithium ion secondary battery cells were charged up to a voltage of 4.3 V at a constant current of 240 mA and, in addition, up to a current of 24 mA at a constant voltage of 4.3 V. Then, the lithium ion secondary battery cells were discharged down to a voltage of 2.8 V at a current of 240 mA, of which the charge and discharge as one cycle were repeated 50 times. Then, discharge capacity (Q[0.5C]50) at the $50^{th}$ charge and discharge cycle was divided by the initial discharge capacity (Q1) to obtain capacity retention (%). The results are shown in Table 1.

Example 2

A lithium ion secondary battery cell was manufactured according to the same method as Example 1, except that the electrolyte (a 3.9 M (mol/L) LiFSA DMC solution) and the second solvent (trifluorotoluene) were used in a volume ratio of 90:10.

Example 3

A lithium ion secondary battery cell was manufactured according to the same method as Example 1, except that the electrolyte (a 3.9 M (mol/L) LiFSA DMC solution) and the second solvent (trifluorotoluene) were used in a volume ratio of 80:20.

Example 4

A lithium ion secondary battery cell was manufactured according to the same method as Example 1, except that the electrolyte (a 3.9 M (mol/L) LiFSA DMC solution) and the second solvent (trifluorotoluene) were used in a volume ratio of 70:30.

Example 5

A lithium ion secondary battery cell was manufactured according to the same method as Example 1, except that the electrolyte (a 3.9 M (mol/L) LiFSA DMC solution) and the second solvent (trifluorotoluene) were used in a volume ratio of 25:75.

Example 6

A lithium ion secondary battery cell was manufactured according to the same method as Example 1, except that the electrolyte was adjusted to have an electrolytic salt concentration of 3.0 M (mol/L) (i.e., the electrolyte was a 3.0 M (mol/L) LiFSA DMC solution) and used with the second solvent (trifluorotoluene) in a volume ratio of 50:50.

Comparative Example 1

A lithium ion secondary battery cell was manufactured according to the same method as Example 1, except that the electrolyte (a 3.9 M (mol/L) LiFSA DMC solution) and the second solvent (trifluorotoluene) were used in a volume ratio of 100:0 (i.e., no second solvent).

Comparative Example 2

A lithium ion secondary battery cell was manufactured according to the same method as Example 1, except that a 2.0 M (mol/L) LiFSA DMC solution was used instead of the poor solvent-containing electrolyte.

Comparative Example 3

A lithium ion secondary battery cell was manufactured according to the same method as Example 1, except that the electrolyte (a 3.9 M (mol/L) LiFSA DMC solution) and the second solvent (trifluorotoluene) were used in a volume ratio of 12:88.

Comparative Example 4

A lithium ion secondary battery cell was manufactured according to the same method as Example 1, except that a 2.8 M (mol/L) LiFSA DMC solution was used as the electrolyte, and this high concentration solution and the second solvent (trifluorotoluene) were used in a volume ratio of 95:5.

TABLE 1

| | Area ratio of free solvent (%) | Li salt concentration (M (mol/L)) | Volume ratio of second solvent (volume %) | Viscosity (mPa · s) | Capacity retention (%) |
|---|---|---|---|---|---|
| Example 1 | 3 | 1.9 | 61 | 3.8 | 90 |
| Example 2 | 3 | 3.6 | 10 | 22 | 84 |
| Example 3 | 3 | 3.2 | 21 | 15 | 85 |
| Example 4 | 3 | 2.7 | 37 | 10 | 91 |
| Example 5 | 3 | 0.95 | 82 | 1.2 | 83 |
| Example 6 | 15 | 1.5 | 52 | 2.8 | 85 |
| Comparative Example 1 | 3 | 3.9 | 0 | 42 | 79 |
| Comparative Example 2 | 45 | 2 | 0 | 4.5 | 21 |
| Comparative Example 3 | 3 | 0.48 | 93 | 0.9 | 69 |
| Comparative Example 4 | 20 | 2.7 | 6 | 8.5 | 75 |

In Table 1, the [Li salt concentration] is a concentration (an apparent concentration) based on the entire volume of an electrolyte, and a volume ratio of the second solvent is a ratio (volume %) of the second solvent relative to the entire volume of the first and second solvents.

Examples 1 to 6 all showed low viscosity and high capacity retention. Particularly, when the Li salt concentration was in a range of greater than or equal to 1.7 M (mol/L) and less than or equal to 3.0 M (mol/L) and, specifically, greater than or equal to 1.9 M (mol/L) and less than or equal to 2.7 M (mol/L), capacity retention became greater than or equal to 90%. On the other hand, Comparative Examples 1 to 4 showed no sufficient improved results. Comparative Example 1 used only the electrolyte and thus showed excessively high viscosity and deteriorated capacity retention. Comparative Example 2 used only the electrolyte having a low concentration and thus showed low viscosity but sharply deteriorated capacity retention. Comparative Example 3 used the electrolyte having a low Li salt concentration and thus showed deteriorated capacity retention. Comparative Example 4 used the free solvent in a large amount and thus showed a high peak area ratio of the free solvent and thus deteriorated capacity retention.

The terminology used herein is for the purpose of describing particular embodiments only and is not intended to be limiting of the inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept."

As used herein, the terms "substantially," "about," and similar terms are used as terms of approximation and not as terms of degree, and are intended to account for the inherent deviations in measured or calculated values that would be recognized by those of ordinary skill in the art.

As used herein, the term "major component" refers to a component that is present in a composition, polymer, or product in an amount greater than an amount of any other single component in the composition or product. In contrast, the term "primary component" refers to a component that makes up at least 50% (wt % or at %) or more of the composition, polymer, or product.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While the present invention has been particularly shown and described with reference to desirable embodiments thereof, it is to be understood that the invention is not limited to the disclosed embodiments, but, on the contrary, is intended to cover various modifications and equivalent arrangements included within the spirit and scope of the appended claims, and equivalents thereof.

For example, in the above embodiments, the present invention is applied to a lithium ion secondary battery, but the present invention may also be applied to other types of non-aqueous electrolyte secondary batteries.

DESCRIPTION OF SYMBOLS

10: lithium ion secondary battery
20: positive electrode
21: positive current collector
22: positive active material layer
30: negative electrode
31: negative current collector
32: negative active material layer
40: separator
100: electrolyte
200: second solvent
300: poor solvent-containing electrolyte 400: good solvent
500: low concentration electrolyte

What is claimed is:

1. A non-aqueous electrolyte for a secondary battery, comprising:
an electrolytic salt, a first solvent, and a second solvent, wherein:
the electrolytic salt is included at a concentration of about 1.7 M (mol/L) to about 3.0 M (mol/L) in the non-aqueous electrolyte,
the first solvent has a solubility of the electrolytic salt in a range from about 100 g to about 400 g,
the second solvent has a solubility of the electrolytic salt of less than or equal to about 1 g;
the first solvent comprises a coordination solvent coordinated with an ionized ion from the electrolytic salt and a free solvent not coordinated with an ionized ion from the electrolytic salt;
wherein the second solvent is trifluorotoluene ($CF_3Ph$);
an amount of the first solvent, an amount of the second solvent, and the concentration of the electrolytic salt together provide a viscosity of the non-aqueous electrolyte of 3.8 mPa·s to 22 mPa·s; and
a peak area ratio of the free solvent determined by a Raman spectrum is less than about 20%.

2. The non-aqueous electrolyte of claim 1, wherein the electrolytic salt comprises a lithium salt.

3. The non-aqueous electrolyte of claim 1, wherein the first solvent comprises at least one selected from dimethyl carbonate (DMC), ethyl acetate (EA), methyl propionate (MP), and methyl acetate (MA).

4. The non-aqueous electrolyte of claim 1, wherein the peak area ratio of the free solvent is greater than or equal to about 1%.

5. The non-aqueous electrolyte of claim 1, wherein the peak area ratio of the free solvent is in a range from about 3% to about 15%.

6. A method of manufacturing a secondary battery, comprising:
providing the non-aqueous electrolyte of claim 1 to an electrode assembly of the secondary battery.

7. The non-aqueous electrolyte of claim 1, wherein the electrolytic salt is included at a concentration of about 1.9 M (mol/L) to about 2.7 M (mol/L) in the non-aqueous electrolyte.

8. A secondary battery comprising the non-aqueous electrolyte for a secondary battery of claim 1.

9. The secondary battery of claim 8, wherein the electrolytic salt comprises a lithium salt.

10. The secondary battery of claim 8, wherein the first solvent comprises at least one selected from dimethyl carbonate (DMC), ethyl acetate (EA), methyl propionate (MP), and methyl acetate (MA).

11. The secondary battery of claim 8, wherein the peak area ratio of the free solvent is greater than or equal to about 1%.

12. The secondary battery of claim 8, wherein the peak area ratio of the free solvent is in a range from about 3% to about 15%.

13. The secondary battery of claim 8, wherein the secondary battery is a lithium ion secondary battery.

* * * * *